(12) United States Patent
Martin

(10) Patent No.: US 10,985,680 B2
(45) Date of Patent: Apr. 20, 2021

(54) METHOD AND CONTROLLER FOR CONTROLLING AN ELECTRIC MOTOR

(71) Applicant: PROTEAN ELECTRIC LIMITED, Surrey (GB)

(72) Inventor: Timothy John Martin, Berkshire (GB)

(73) Assignee: PROTEAN ELECTRIC LIMITED, Surrey (GB)

( * ) Notice: Subject to any disclaimer, the term of this patent is extended or adjusted under 35 U.S.C. 154(b) by 0 days.

(21) Appl. No.: 16/322,198

(22) PCT Filed: Jul. 31, 2017

(86) PCT No.: PCT/IB2017/054664
§ 371 (c)(1),
(2) Date: Jan. 31, 2019

(87) PCT Pub. No.: WO2018/025164
PCT Pub. Date: Feb. 8, 2018

(65) Prior Publication Data
US 2019/0165704 A1  May 30, 2019

(30) Foreign Application Priority Data

Aug. 1, 2016  (GB) ..................................... 1613226

(51) Int. Cl.
*H02P 6/18*  (2016.01)
*H02P 6/182*  (2016.01)
(Continued)

(52) U.S. Cl.
CPC ............ *H02P 6/182* (2013.01); *B60L 3/0023* (2013.01); *H02P 3/18* (2013.01); *H02P 3/22* (2013.01); *B60L 2210/42* (2013.01)

(58) Field of Classification Search
CPC .............................. H02P 6/182; B60L 3/0023
(Continued)

(56) References Cited

U.S. PATENT DOCUMENTS 5,038,092 A * 8/1991 Asano ............... H02M 7/53875
                                                    318/811
8,587,229 B2 * 11/2013 Boudjemai ........... F02D 41/042
                                                    318/381
(Continued)

FOREIGN PATENT DOCUMENTS

DE     102007020509 A1    11/2008
DE     102014209887 A1    11/2015

OTHER PUBLICATIONS

European Patent Office, International Search Report, dated Oct. 26, 2017, WIPO, Munich.
(Continued)

*Primary Examiner* — Erick D Glass
(74) *Attorney, Agent, or Firm* — Allen Dyer Doppelt & Gilchrist, PA

(57) ABSTRACT

A method for controlling an electric motor, the method comprising receiving a command to place the electric motor in a short circuit mode; varying a limit to an available pulse width modulation depth for controlling current flow in the electric motor to a predetermined value over a predetermined time period or at a predetermined rate of change; wherein upon the pulse width modulation depth limit being varied to the predetermined value placing the electric motor in the short circuit mode.

14 Claims, 11 Drawing Sheets

(51) Int. Cl.
H02P 3/22 (2006.01)
B60L 3/00 (2019.01)
H02P 3/18 (2006.01)

(58) Field of Classification Search
USPC .................................................. 318/400.34
See application file for complete search history.

(56) References Cited

U.S. PATENT DOCUMENTS

| 2004/0021438 | A1* | 2/2004 | Tarasinski | F16H 61/32 |
| | | | | 318/400.29 |
| 2010/0202089 | A1 | 8/2010 | Kuehner et al. | |
| 2013/0076277 | A1* | 3/2013 | Jang | H02P 23/14 |
| | | | | 318/139 |
| 2014/0070742 | A1 | 3/2014 | Schulz | |
| 2014/0361719 | A1 | 12/2014 | Raichle et al. | |

OTHER PUBLICATIONS

European Patent Office, Written Opinion of the International Searching Authority, dated Aug. 2, 2018, WIPO, Munich.
Intellectual Property Office, Exam Report Standard, dated Oct. 18, 2018, IPO, South Wales.
Intellectual Property Office, Search Report First, dated Sep. 30, 2016, IPO, South Wales.

* cited by examiner

METHOD AND CONTROLLER FOR CONTROLLING AN ELECTRIC MOTOR

The present invention relates to a method and controller for controlling an electric motor, in particular a method and controller for placing an electric motor in a short circuit mode of operation.

Electric motors work on the principle that a current carrying wire will experience a force when in the presence of a magnetic field. When the current carrying wire is placed perpendicular to the magnetic field the force on the current carrying wire is proportional to the flux density of the magnetic field. Typically, in an electric motor the force on a current carrying wire is formed as a rotational torque.

A three phase electric motor typically includes three coil sets, where each coil set is arranged to generate a magnetic field associated with one of the three phases of an alternating voltage.

To increase the number of magnetic poles formed within an electric motor, each coil set will typically have a number of coil sub-sets that are distributed around the periphery of the electric motor, which are driven to produce a rotating magnetic field.

By way of illustration, FIG. 1 shows a typical three phase electric motor 10 having three coil sets 14, 16, 18. Each coil set consists of four coil sub-sets that are connected in series, where for a given coil set the magnetic field generated by the respective coil sub-sets will have a common phase.

The three coil sets of a three phase electric motor are typically configured in either a delta or wye configuration.

A control unit for a three phase electric motor having a DC power supply will typically include a three phase bridge inverter that generates a three phase voltage supply for driving the electric motor. Each of the respective voltage phases is applied to a respective coil set of the electric motor.

A three phase bridge inverter includes a number of switching devices, for example power electronic switches such as Insulated Gate Bipolar Transistor IGBT switches, which are used to generate an alternating voltage from a DC voltage supply.

Examples of known types of electric motor include the induction motor, brushless permanent magnet motor, switched reluctance motor and synchronous slip ring motor, which have a rotor and a stator, as is well known to a person skilled in the art.

The rotor for a permanent magnet motor typically includes a plurality of permanent magnets, where the plurality of permanent magnets is mounted on or in a rotor back-iron such that the magnetic field alternates in polarity around the circumference of the rotor. As the rotor rotates relative to the stator the plurality of permanent magnets are arranged to sweep across the ends of coil windings mounted on the stator. Appropriate switching of currents in the coil windings allows synchronized attraction and repulsion of the poles of the permanent magnets to produce rotation or the rotor.

As the force on the current carrying wire, and consequently the torque for an electric motor, is proportional to the flux density of a magnetic field it is desirable for a synchronous permanent magnet traction motor, where torque is an important criterion for the motor, to use magnets with as high a flux density as possible.

However, as the rotor rotates relative to the coil windings a back electromotive force, otherwise known as a back EMF, is generated that opposes the original applied voltage and consequently acts against the current flow that causes the rotor to rotate, thereby limiting the maximum rotation velocity of the rotor.

If a fault occurs in the electric motor system, for example a fault in the electric motor and/or electric motor power source, to avoid high back EMF voltages appearing on the positive power busbar rail the electric motor may be placed in a short-circuit operation mode, otherwise referred to as active short circuit mode, whereby all the coil windings are connected to the negative power busbar rail using the switches within the inverter, or in the alternative all the coil windings are connected to the positive power busbar rail.

However, when transitioning from a normal operational mode, where the electric motor inverter generating a pulse width modulated PWM voltage, to an active short circuit mode, coil winding inductance can cause high current spikes to be generated. This can cause the rotor magnets to become permanently de-magnetized and/or damage or destroy the inverter switches.

For example, FIG. 2 and FIG. 3 show simulated and measured motor coil winding current values respectively for when an inverter transitions to an active short circuit mode from a normal operational mode. As stated above, in normal operational mode voltage is applied across the electric motor coil windings via pulse width modulation PWM 21 during the period from 0 ms to 100 ms with PWM outputs V(svma) 22, V(svmb) 23, and V(svmc) 24. In FIG. 2, the transition from normal operational mode to active short circuit mode, which occurs at 100 ms, results in the d-axis current Id 20, which is aligned with rotor flux, peaking at around −105 A. This level of current can result in permanent demagnetisation of rotor magnets.

In FIG. 3, following the transition of the inverter from normal operational mode to active short circuit mode at 0.1 secs, the electric motor coil windings peak current 30 rises to a maximum of 110 A, which can potentially damage output electronics.

It is desirable to improve this situation.

In accordance with an aspect of the present invention there is provided a method and controller for an electric motor according to the accompanying claims.

The present invention as claimed provides a mechanism for smoothly controlling the transition of an electric motor to an active short circuit mode, thereby minimising peak inductive current flow within the electric motor's power electronics, including the electric motor's inverter switches. During the transitioning of an electric motor to an active short circuit mode the present invention allows inductive current generated by the electric motor windings to increase at a controlled rate to prevent high peak current.

The present invention will now be described, by way of example, with reference to the accompanying drawings, in which.

The embodiment of the invention described is for a controller for controlling the configuration and operation of an inverter, where the inverter is arranged to control current within coil windings of an electric motor. For the purposes of the present embodiment the electric motor is for use in a wheel of a vehicle, however the electric motor may be located anywhere within the vehicle. The motor is of the type having a set of coils being part of the stator for attachment to a vehicle, radially surrounded by a rotor carrying a set of magnets for attachment to a wheel. For the avoidance of doubt, the various aspects of the invention are equally applicable to an electric generator having the same arrangement. As such, the definition of electric motor is intended to include electric generator. In addition, some of the aspects of the invention are applicable to an arrangement having the rotor centrally mounted within radially surrounding coils. As would be appreciated by a person skilled in the art, the present invention is applicable for use with other types of electric motors.

Figure 1:
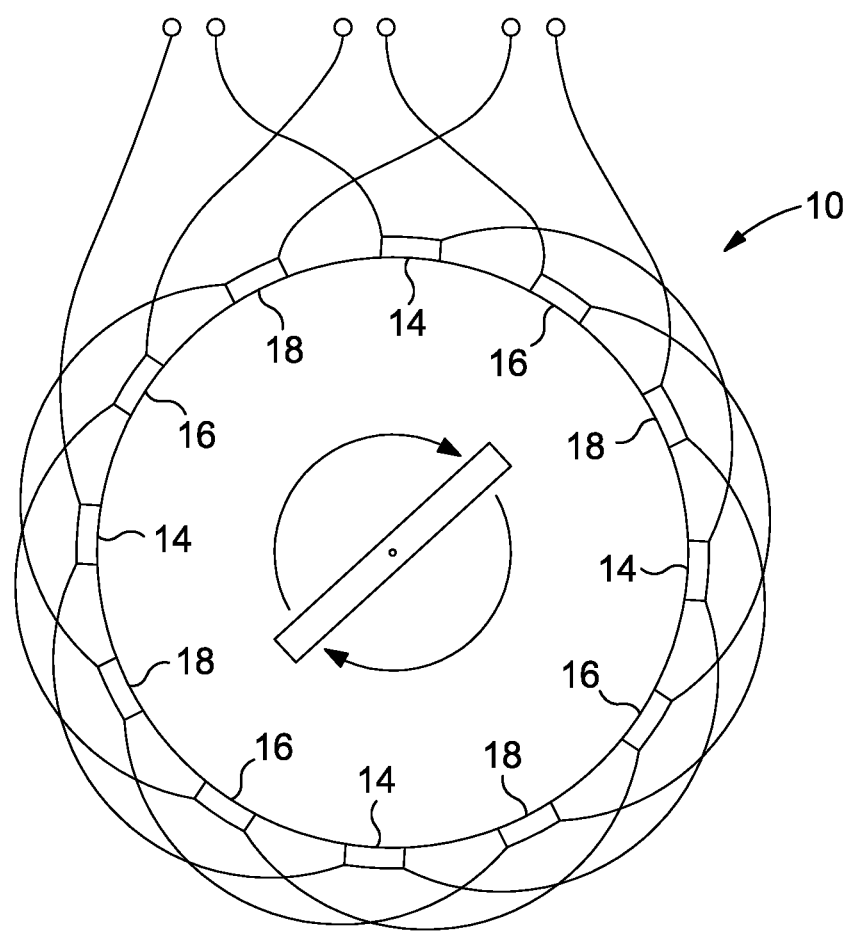
FIG. 1 illustrates a three phase electric motor.
Figure 2:
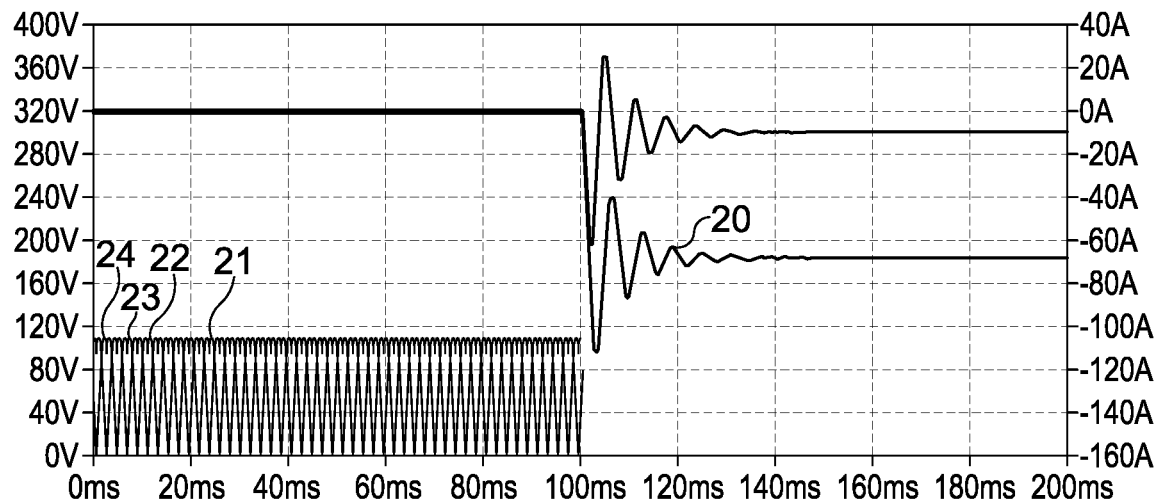
FIG. 2 illustrates simulated motor coil winding current values when transitioning from a normal operational mode to an active short circuit mode.
Figure 3:
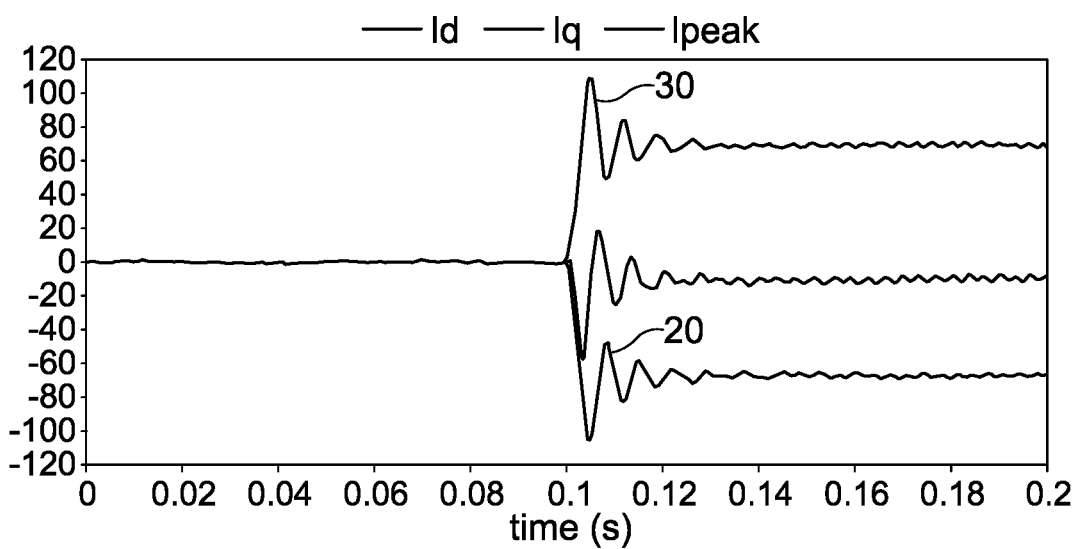
FIG. 3 illustrates measured motor coil winding current values when transitioning from a normal operational mode to an active short circuit mode.
Figure 4:
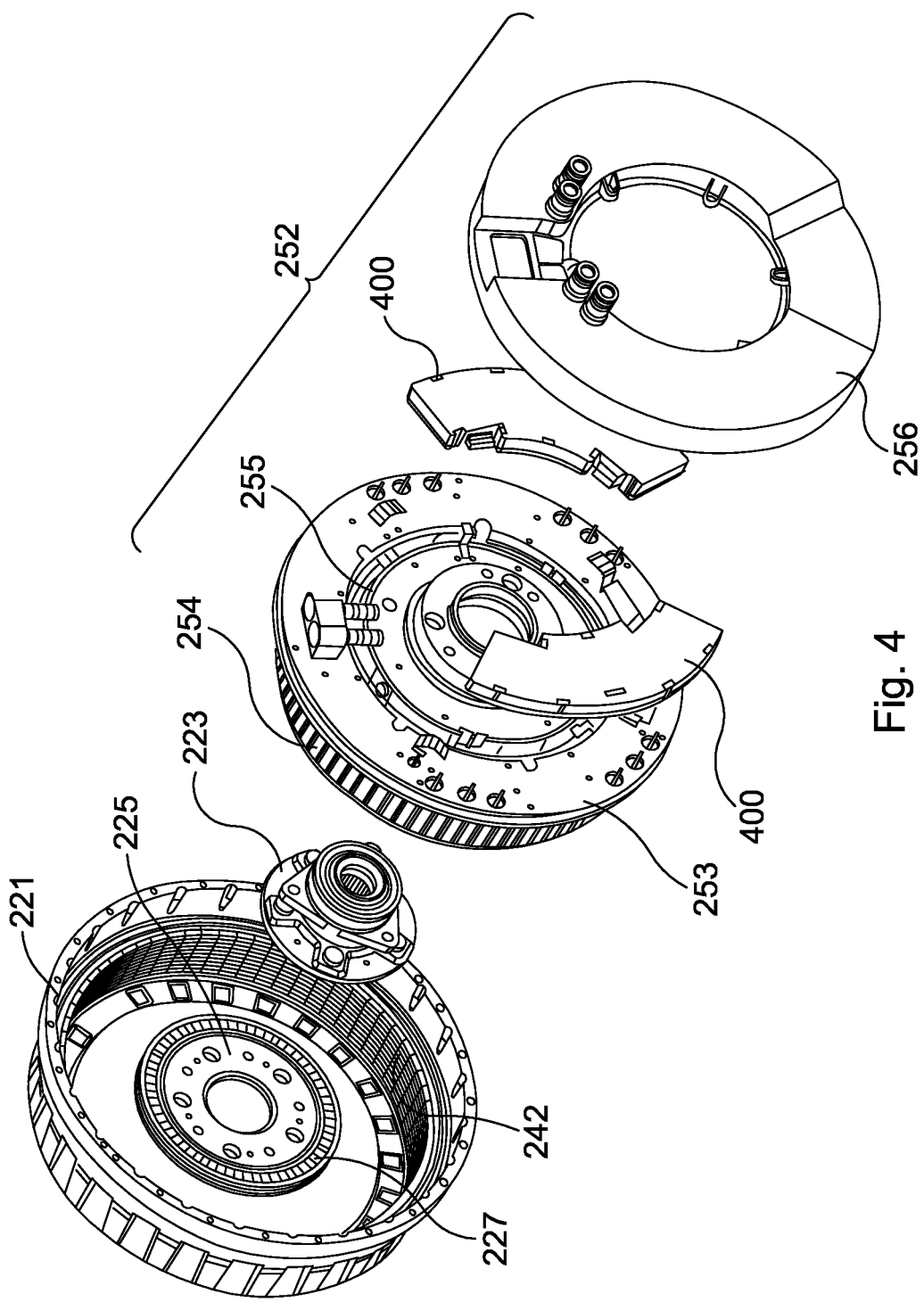
FIG. 4 illustrates an exploded view of an electric motor as used in an embodiment of the present invention.
Figure 5:
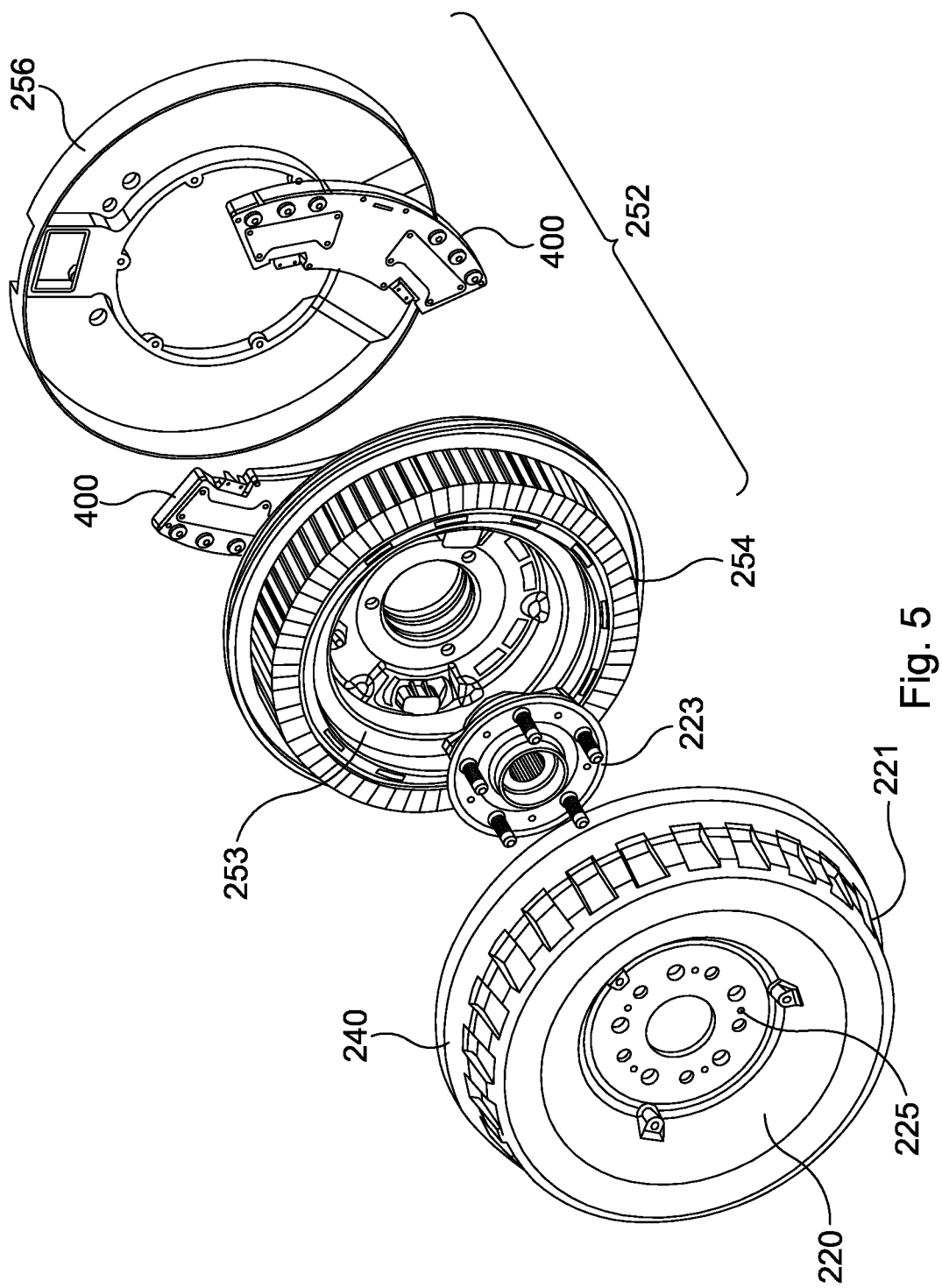
FIG. 5 illustrates an exploded view of the electric motor shown in FIG. 4 from an alternative angle.

For the purposes of the present embodiment, as illustrated in FIG. 4 and FIG. 5, the in-wheel electric motor includes a stator 252 comprising a heat sink 253, multiple coils 254, two control devices 400 mounted on the heat sink 253 on a rear portion of the stator for driving the coils, and an annular capacitor, otherwise known as a DC link capacitor, mounted on the stator within the inner radius of the control devices 400. The coils 254 are formed on stator tooth laminations to form coil windings. A stator cover 256 is mounted on the rear portion of the stator 252, enclosing the control devices 400 to form the stator 252, which may then be fixed to a vehicle and does not rotate relative to the vehicle during use.

Each control device 400 includes two inverters 410 and control logic 420, which in the present embodiment includes a processor, for controlling the operation of the inverters 410, which is schematically represented in FIG. 4.

Although for the purposes of the present embodiment the in-wheel electric motor includes two control devices, where each control device includes control logic, in other words a controller, for controlling the operation of an inverter, any configuration of control logic and inverter combination may be used, including placing the control logic and/or inverters remote to the electric motor.

The annular capacitor is coupled across the inverters 410 and the electric motor's DC power source for reducing voltage ripple on the electric motor's power supply line, otherwise known as the DC busbar, and for reducing voltage overshoots during operation of the electric motor. For reduced inductance the capacitor is mounted adjacent to the control devices 400.

A rotor 240 comprises a front portion 220 and a cylindrical portion 221 forming a cover, which substantially surrounds the stator 252. The rotor includes a plurality of permanent magnets 242 arranged around the inside of the cylindrical portion 221. For the purposes of the present embodiment 32 magnet pairs are mounted on the inside of the cylindrical portion 221. However, any number of magnet pairs may be used.

The magnets are in close proximity to the coil windings on the stator 252 so that magnetic fields generated by the coils interact with the magnets 242 arranged around the inside of the cylindrical portion 221 of the rotor 240 to cause the rotor 240 to rotate. As the permanent magnets 242 are utilized to generate a drive torque for driving the electric motor, the permanent magnets are typically called drive magnets.

The rotor 240 is attached to the stator 252 by a bearing block 223. The bearing block 223 can be a standard bearing block as would be used in a vehicle to which this motor assembly is to be fitted. The bearing block comprises two parts, a first part fixed to the stator and a second part fixed to the rotor. The bearing block is fixed to a central portion 253 of the wall of the stator 252 and also to a central portion 225 of the housing wall 220 of the rotor 240. The rotor 240 is thus rotationally fixed to the vehicle with which it is to be used via the bearing block 223 at the central portion 225 of the rotor 240. This has an advantage in that a wheel rim and tyre can then be fixed to the rotor 240 at the central portion 225 using the normal wheel bolts to fix the wheel rim to the central portion of the rotor and consequently firmly onto the rotatable side of the bearing block 223. The wheel bolts may be fitted through the central portion 225 of the rotor through into the bearing block itself. With both the rotor 240 and the wheel being mounted to the bearing block 223 there is a one to one correspondence between the angle of rotation of the rotor and the wheel.

FIG. 5 shows an exploded view of the same motor assembly illustrated in FIG. 4 from the opposite side. The rotor 240 comprises the outer rotor wall 220 and circumferential wall 221 within which magnets 242 are circumferentially arranged. As previously described, the stator 252 is connected to the rotor 240 via the bearing block at the central portions of the rotor and stator walls.

A V shaped seal is provided between the circumferential wall 221 of the rotor and the outer edge of the stator.

The rotor also includes a set of magnets 227 for position sensing, otherwise known as commutation magnets, which in conjunction with sensors mounted on the stator allows for a rotor flux angle to be estimated. The rotor flux angle defines the positional relationship of the drive magnets to the coil windings. Alternatively, in place of a set of separate magnets the rotor may include a ring of magnetic material that has multiple poles that act as a set of separate magnets.

To allow the commutation magnets to be used to calculate a rotor flux angle, preferably each drive magnet has an associated commutation magnet, where the rotor flux angle is derived from the flux angle associated with the set of commutation magnets by calibrating the measured commutation magnet flux angle. To simplify the correlation between the commutation magnet flux angle and the rotor flux angle, preferably the set of commutation magnets has the same number of magnets or magnet pole pairs as the set of drive magnet pairs, where the commutation magnets and associated drive magnets are approximately radially aligned with each other. Accordingly, for the purposes of the present embodiment the set of commutation magnets has 32 magnet pairs, where each magnet pair is approximately radially aligned with a respective drive magnet pair.

A sensor, which in this embodiment is a Hall sensor, is mounted on the stator. The sensor is positioned so that as the rotor rotates each of the commutation magnets that form the commutation magnet ring respectively rotates past the sensor.

As the rotor rotates relative to the stator the commutation magnets correspondingly rotate past the sensor with the Hall sensor outputting an AC voltage signal, where the sensor outputs a complete voltage cycle of 360 electrical degrees for each magnet pair that passes the sensor.

For improved position detection, preferably the sensor includes an associated second sensor placed 90 electrical degrees displaced from the first sensor.

In the present embodiment the electric motor includes four coil sets with each coil set having three coil sub-sets that are coupled in a wye configuration to form a three phase sub-motor, resulting in the motor having four three phase sub-motors. The operation of the respective sub-motors is controlled via one of the two control devices 400, as described below. However, although the present embodiment describes an electric motor having four coil sets (i.e. four sub motors) the motor may equally have one or more coil sets with associated control devices. In a preferred embodiment the motor includes eight coil sets 60 with each coil set having three coil sub-sets that are coupled in a wye configuration to form a three phase sub-motor, resulting in the motor having eight three phase sub-motors. Similarly, each coil set may have any number of coil sub-sets, thereby allowing each sub-motor to have two or more phases.

Figure 6:
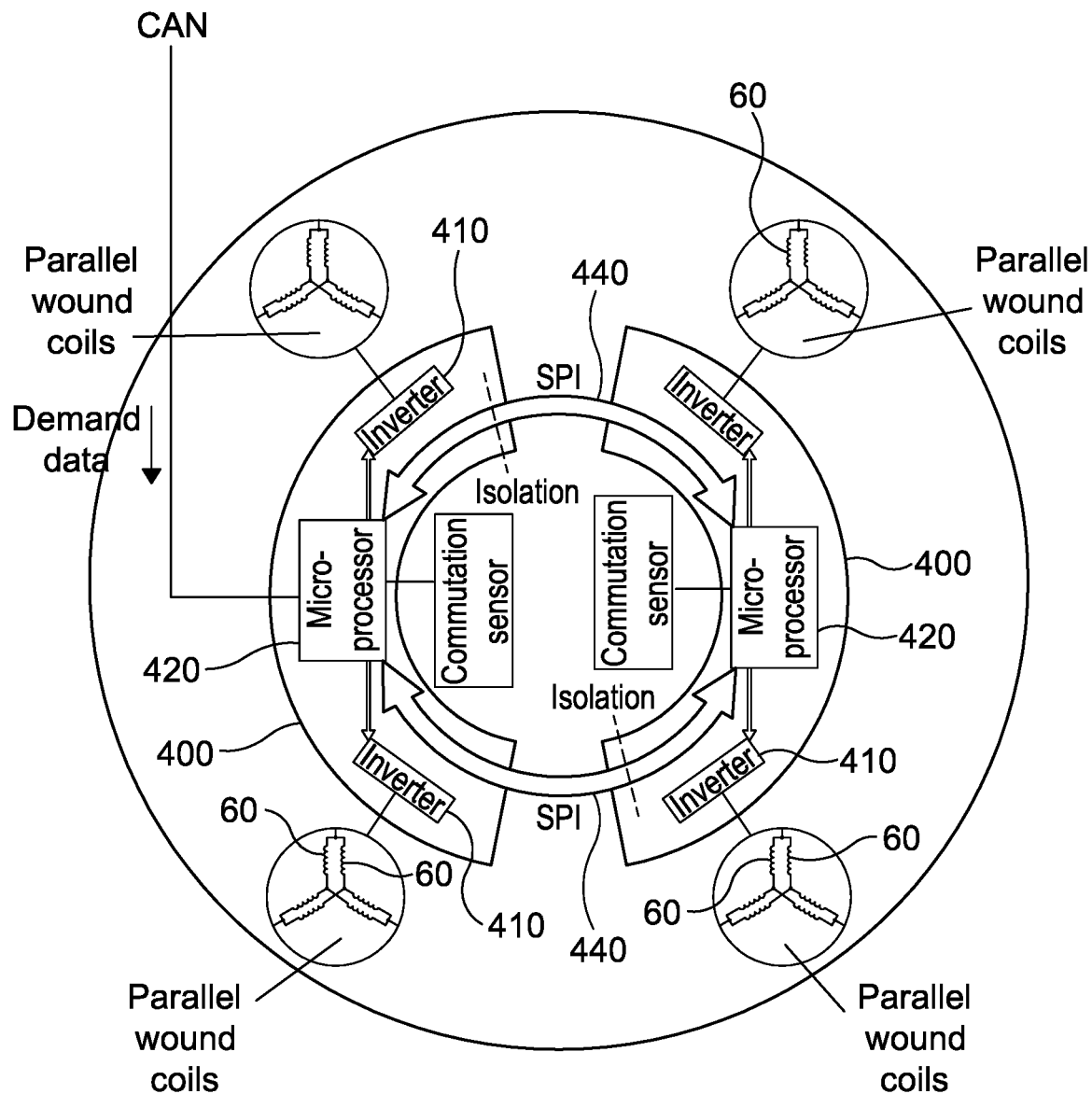
FIG. 6 illustrates an electric motor according to an embodiment of the present invention.

FIG. 6 illustrates the connections between the respective coil sets 60 and the control devices 400, where a respective coil set 60 is connected to a respective three phase inverter 410 included on a control device 400 for controlling current flow within the respective coil sets. As is well known to a person skilled in the art, a three phase inverter contains six switches, where a three phase alternating voltage may be generated by the controlled operation of the six switches. However, the number of switches will depend upon the number of voltage phases to be applied to the respective sub motors, where the sub motors can be constructed to have any number of phases.

Figure 7:
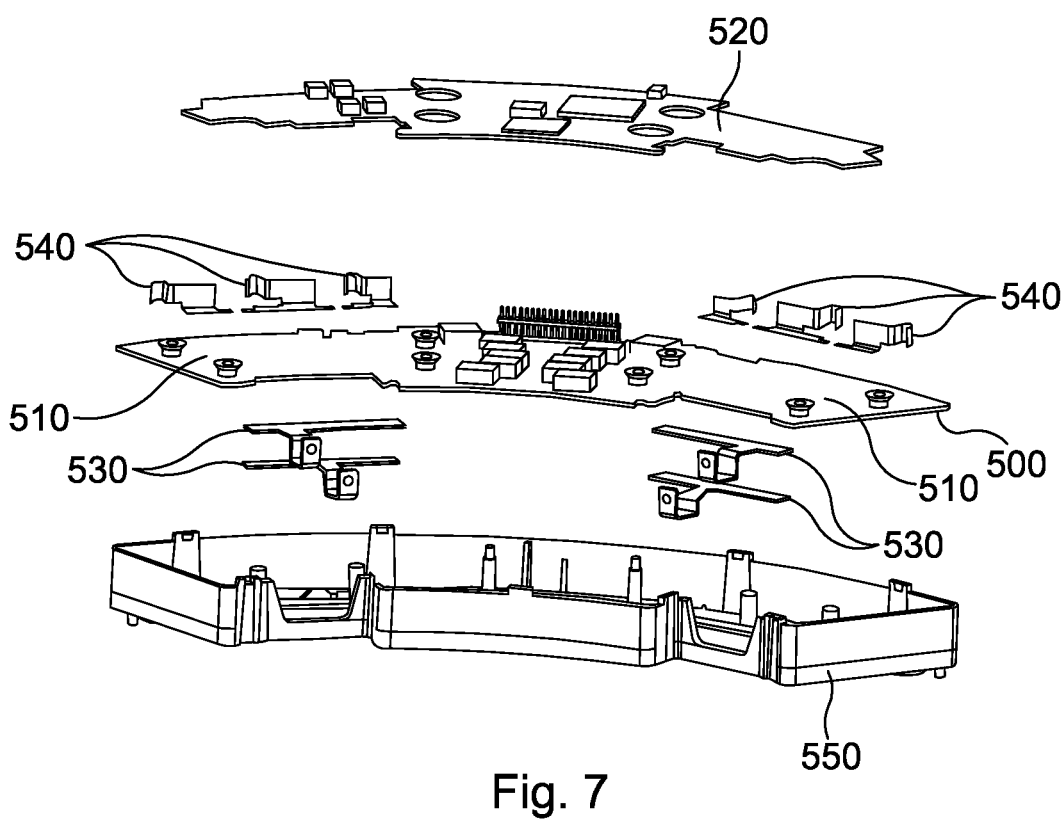
FIG. 7 illustrates an exploded view of a control device according to an embodiment of the present invention.

Preferably, the control devices 400 are of a modular construction. FIG. 7 illustrates an exploded view of a preferred embodiment, where each control device 400, otherwise known as a power module, includes a power printed circuit board 500 in which are mounted two power substrate assemblies 510, a control printed circuit board 520, four power source busbars 530 for connecting to a DC battery, and six phase winding busbars 540 for connecting to respective coil windings. Each of the control device components are mounted within a control device housing 550 with the four power source busbars 530 being mounted on an opposite side of the control device housing 550 to the phase winding busbars 540.

Each power substrate 510 is arranged to be mounted in a respective aperture formed in the power printed circuit board 500.

The power printed circuit board 500 includes a variety of components that include drivers for the inverter switches formed on the power substrate assemblies 510, where the drivers are typically used to convert control signals into a suitable form to turn the inverter switches on and off.

The control printed circuit board 520 includes a processor for controlling the operation of the inverter switches. Additionally, each control printed circuit board 520 includes an interface arrangement to allow communication between the respective control devices 400 via a communication bus with one control device 400 being arranged to communicate with a vehicle controller mounted external to the electric motor. The processor 420 on each control device 400 is arranged to handle communication over the interface arrangement.

As stated above, the processors 420 on the respective control devices 400 are arranged to control the operation of the inverter switches mounted on the respective power substrates 520 within the control housing 550, thereby allowing each of the electric motor coil sets 60 to be supplied with a three phase voltage supply resulting in the respective coil sub-sets generating a rotating magnetic field. As stated above, although the present embodiment describes each coil set 60 as having three coil sub-sets the present invention is not limited by this and it would be appreciated that each coil set 60 may have one or more coil sub-sets.

Under the control of the respective processors 420, each three phase bridge inverter 410 is arranged to provide pulse width modulation PWM voltage control across the respective coil sub-sets, thereby generating a current flow in the respective coil sub-sets for providing a required torque by the respective sub-motors. In other words, the torque output of the motor is controlled by accurately controlling the phase coil currents. These in turn are controlled by applying voltages to the phase coil terminals. These voltages are applied using pulse-width modulation to the output stages of a three-phase inverter, consisting of a high-side and a low-side IGBT for each phase.

PWM control works by using the motor inductance to average out an applied pulse voltage to drive the required current into the motor coils. Using PWM control an applied voltage is switched across the motor windings. During the period when voltage is switched across the motor coils, the current rises in the motor coils at a rate dictated by their inductance and the applied voltage. The PWM voltage control is switched off before the current has increased beyond a required value, thereby allowing precise control of the current to be achieved.

For a given coil set 60 the three phase bridge inverter 410 switches are arranged to apply a single voltage phase across each of the coil sub-sets.

Using PWM switching, the plurality of switches are arranged to apply an alternating voltage across the respective coil sub-sets. The voltage envelope and phase angle of the electrical signals is determined by the modulating voltage pulses.

Figure 8:
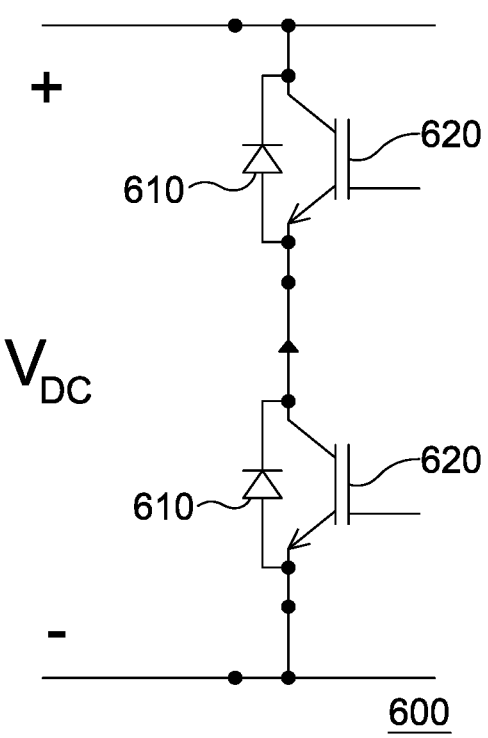
FIG. 8 illustrates a leg of an inverter.

The inverter switches can include semiconductor devices such as MOSFETs or IGBTs. In the present example, the switches comprise IGBTs. However, any suitable known switching circuit can be employed for controlling the current. For a three phase inverter having six switches configured to drive a three phase electric motor, the six switches are configured as three parallel sets of two switches, where each pair of switches is placed in series and form a leg 600 of the three phase bridge circuit, with a fly-back diode 610, otherwise known as a reverse diode, coupled in anti-parallel across each switch 620, as illustrated in FIG. 8. A single phase inverter will have two pairs of switches 620 arranged in series to form two legs 600 of an inverter. The switches 620 located on the top half of the inverter leg are called the high-side switches, while the switches 620 on the lower half of the inverter leg are called the low-side switches.

As stated above, each of the inverter legs 600 are electrically coupled between a pair of power source busbars.

As stated above, PWM switching is used to apply an alternating voltage to the electric motors coil windings, where the rotor speed is dependent upon the amplitude of the voltage applied across the coil windings, where the torque applied to the rotor results from drive current within the coil windings. Typically this mode of operation is known as the normal operational mode. In this mode of operation PWM switching may also be utilised to counteract the back EMF generated by the electric motor, thereby allowing the electric motor to 'coast' without either a braking force or a drive torque being generated by the electric motor.

In addition to the inverter being used to apply a drive current to the coil windings via the application of PWM switching, if no torque is required of the electric motor and/or the electric motor is required to be placed in a disabled mode the inverter switches can be placed in an open circuit configuration or a short circuit configuration.

In the open circuit configuration the inverter switches are placed in an open circuit arrangement resulting in any current generated by the electric motor flowing through the fly-back diodes, which are coupled in anti-parallel across each of the inverter switches, onto the power source busbars.

In the active short circuit mode the inverter switches are placed in a configuration that results in the short circuiting of the electric motor coil windings. For example, by closing either the low side or the high side inverter switches, thereby preventing voltage resulting from the back EMF generated by the electric motor being placed on the power source busbars.

To avoid high current spikes being generated when transitioning the inverter from either the normal operational mode, where PWM voltage is applied to the coil windings, or the open circuit configuration to the short circuit configuration, a limit is gradually applied to the available PWM modulation depth over a period of time prior to the transition of the inverter from either the normal operational mode or the open circuit configuration to the short circuit configuration. This allows a smooth transition of the electric motor to a short circuit mode, thereby minimising peak inductive current flow within the electric motors power electronics, including the electric motors inverter switches.

In other words, peak inductive current is minimised by imposing a limit to the PWM modulation depth that decreases to a predetermined value, for example zero, over a predetermined time period.

Figure 9:
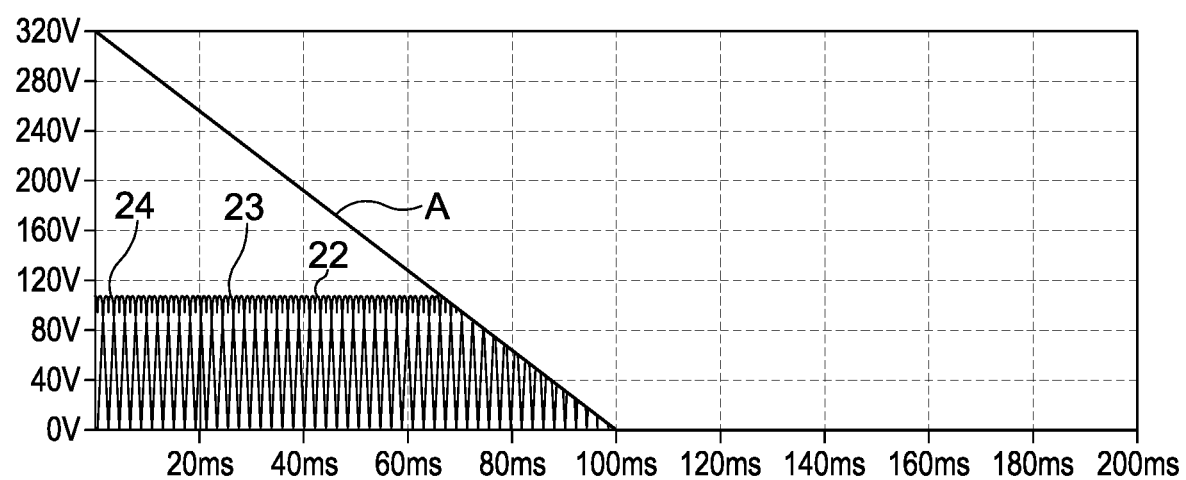
FIG. 9 illustrates a PWM soft start ramp limit according to an embodiment of the present invention.

By way of illustration, FIG. 9 represents a graph showing a gradual reduction in available PWM modulation depth over a predetermined time period for a transition from a normal operational mode to an active short circuit mode. In the embodiment illustrated in FIG. 9 the available PWM modulation depth is reduced from 100 percent to zero over a 100 ms time period. However, any suitable time period may be selected for reducing the available PWM modulation depth.

The PWM modulation depth is equivalent to the duty cycle of the high-side switches (for example IGBTs), and is the proportion of the time that the high-side switches are switched on. The duty cycle of the low-side switches is the inverse of the high-side switches. In other words, when the high-side duty cycle (i.e. PWM modulation depth) is 100%, the low-side duty cycle is 0% and full bus voltage is applied to the coil. When the high-side duty cycle is 0%, the low-side duty cycle is 100%, and zero volts is applied to the coil.

The available PWM modulation depth is represented by line A, where a 100 percent modulation depth is available at time zero, reducing to an available modulation depth of zero 100 ms later.

The PWM outputs from the respective inverter legs for driving current in a respective coil winding are represented by voltage V(svma) 22, V(svmb) 23 and V(svmc) 24, with a battery voltage of 320 volts. A 100 percent PWM modulation depth corresponds to battery voltage, which within the present illustration corresponds to 320 volts.

At time zero (i.e. 0 ms), the PWM output voltage for V(svma) 22, V(svmb) 23 and V(svmc) 24 is 100 volts, where the available PWM modulation depth is 100 percent, namely 320V. Accordingly, at time zero the PWM output voltage is not restricted by the available PWM modulation depth.

After 50 ms, the available PWM modulation depth has reduced to 50 percent, which would correspond to a PWM output voltage of 160 volts. Accordingly, the available PWM modulation depth does not restrict the PWM output voltages for V(svma) 22, V(svmb) 23 and V(svmc) 24, which are maintained at 100 volts.

However, after 70 ms, the reduction in available PWM modulation depth results in a gradual reduction in the PWM output voltage for V(svma) 22, V(svmb) 23 and V(svmc) 24. Accordingly, even if the PWM output voltage control input request is maintained at 100 volts the reduction in available PWM modulation depth will prevent this occurring. In other words, the PWM modulation depth will be dictated by either the PWM output voltage control input request or the available PWM modulation depth, whichever is the lower of the two.

In other words, within the embodiment illustrated by FIG. 9, the reduction in available PWM depth starts at 100 percent (equivalent to an applied phase voltage of battery volts) and reduces to 0 percent (equivalent to zero volts) over a period of 100 ms, thereby gradually limiting the output PWM of each of the three electrical phases. This process is referred to as a soft-start ramp limit.

Although the present embodiment illustrates a gradual reduction of PWM modulation depth from 100 percent to zero percent over a 100 ms time period, the change in available PWM modulation depth may occur from any predetermined value over any predetermined time period and equally at any predetermined rate of change. For example, the available PWM modulation depth could be reduced immediately to 100 volts at 0 ms (i.e. the available PWM modulation depth corresponds to the requested PWM output voltage), with a subsequent reduction in available PWM modulation depth over a predetermined time period.

For the transition from an open circuit configuration to a short circuit configuration initially both high and low side IGBT switches for the respective inverter legs (i.e. for each voltage phase) will be open circuit, where the PWM outputs from these inverter legs are disabled. Upon activation of the process for restricting the available PWM modulation depth the high-side of the IGBT switches are retained in their open circuit configuration.

As the PWM soft-start ramp reduces to zero (i.e. the available PWM modulation depth), so the low-side IGBT duty cycle increases to 100%, since it is the inverse of the PWM modulation depth. This increase in low-side duty cycle from 0% to 100% is applied to all three motor phases at the same time.

For example, if the initial ASC soft-start ramp limit is set at 100 percent (i.e. the available PWM depth is 100 percent), the high-side IGBT switches can be maintained in an open circuit configuration with the low-side IGBT switches duty cycle being arranged to ramp up from 0 percent (i.e. open circuit) to 100 percent (i.e. closed circuit).

Figure 10:
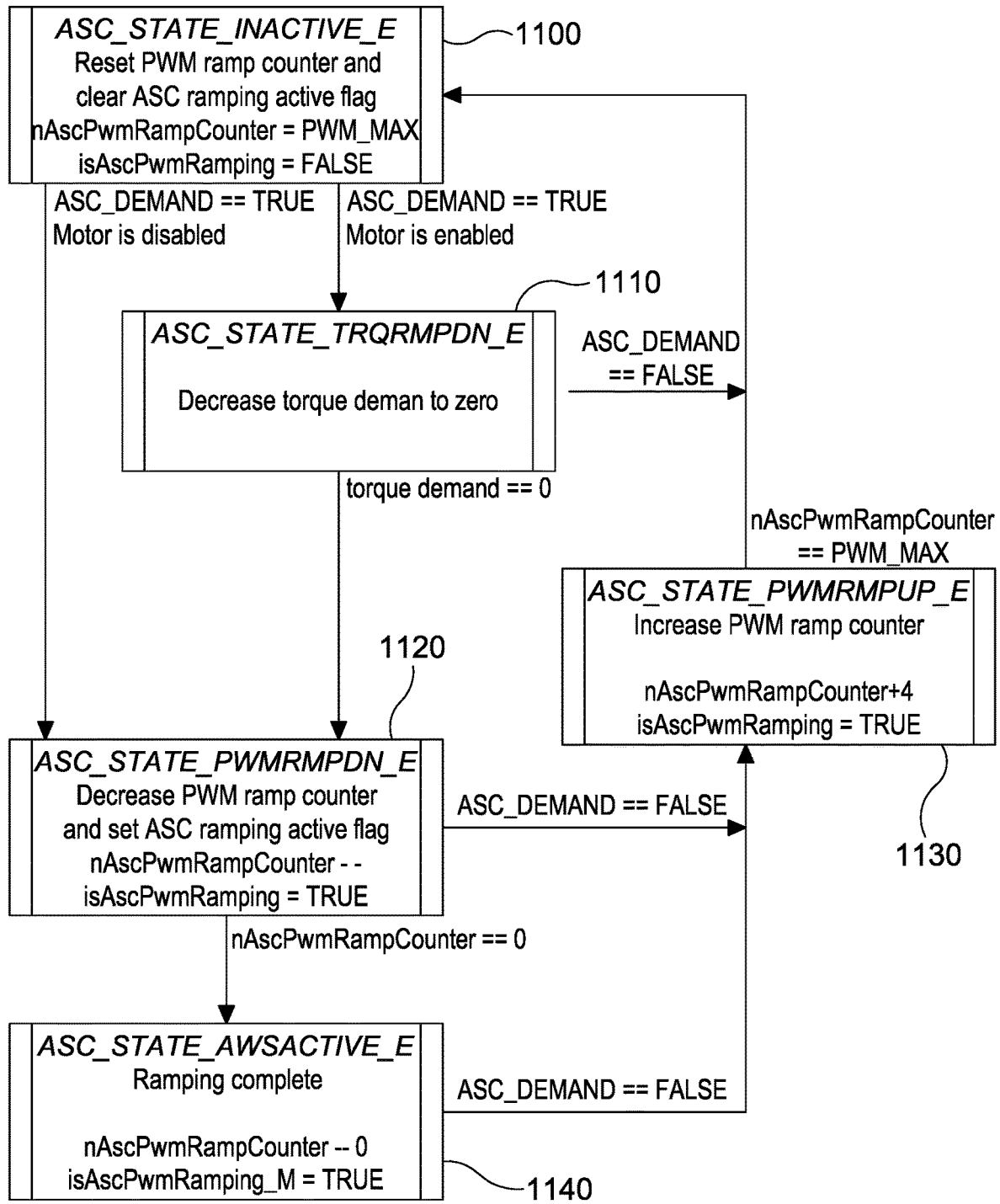
FIG. 10 illustrates a state diagram for implementing a PWM soft start ramp limit according to an embodiment of the present invention.

FIG. 10 represents a state diagram of a preferred embodiment for controlling the transition of an electric motor from a normal operational mode or an open circuit mode to an active short circuit mode, where the transition involves a gradual reduction in available PWM modulation depth. The state diagram includes a soft-start ramp limit process, where the state diagram includes the terms ASC_DEMAND, PWM_MAX, nAscPwmRampCounter, and isAscPwmRamping.

ASC_DEMAND is an input command for entering the active short circuit mode, PWM_MAX is a value corresponding to the maximum PWM modulation depth, nAscPwmRampCounter is a ramp counter where the value of the counter corresponds to an available PWM modulation depth, isAscPwmRamping is a flag indicating that an output PWM soft-start limit is being imposed.

Prior to activation 1100 of the soft-start ramp limit process, where the active short circuit mode is inactive, the PWM ramp counter is reset and the active short circuit active flag is cleared. In other words, nAscPwmRampCounter is set to PWM_MAX and the isAscPwmRamping flag is set to FALSE.

Upon a demand being received to enter active short circuit mode, if the electric motor is in a normal operational mode, preferably the torque demand is reduced to zero 1110.

Typically the demand to enter the active short circuit mode will be received from a vehicle controller located within the vehicle, where the electric motor is arranged to provide a drive torque to a wheel of the vehicle.

Upon the torque generated by the electric motor being reduced to zero, with the PWM modulation voltage output providing an appropriate voltage to counteract the effects of the back EMF generated by the electric motor, the isAscPwmRamping flag is set to TRUE and the nAscPwmRampCounter is reduced at a predetermined rate 1120, thereby resulting in the available PWM modulation depth being reduced.

If the electric motor/inverter configuration is in an open circuit mode of operation (i.e. a disabled mode, whereby both the high-side and low-side switches are in their 'off', or open circuit state), upon a demand to enter the active short circuit mode being received the isAscPwmRamping flag is set to TRUE and the nAscPwmRampCounter is reduced from 100% to 0% at a predetermined rate 1120. Since the low-side duty cycle is the inverse of the PWM soft-start ramp (i.e the nAscPwmRampCounter), the low-side 'on' time will increase until the low-side switches from all three phases are fully on (i.e. short circuit). The high-side switches all remain in their 'off' state (i.e. open circuit).

When transitioning from the open circuit mode to the closed circuit mode, each leg of the inverter applies the same PWM depth to each coil winding, thereby ensuring that the electrical phase of each coil winding is the same.

As stated above, any values may be used as the start point of the available PWM depth and the predetermined rate that the nAscPwmRampCounter value is reduced by. Although the nAscPwmRampCounter is configured to reduce in value, equally the nAscPwmRampCounter value can be arranged to increase in value with there being an inverse relationship between the nAscPwmRampCounter value and the available PWM depth.

If at any point the ASC demand becomes false, the PWM limit ramp begins increasing at a chosen rate back to 100 percent 1130.

When the nAscPwmRampCounter value has reached zero 1140, the inverter/electric motor is placed in an active short circuit mode.

Upon the ASC demand becoming false and the PWM limit ramp value has increased to the PWM_MAX value, the algorithm returns to its initial state, and indicates that it is no longer ramping. In other words, the electric motor reverts back to operating in either normal operational mode or in an open circuit mode.

Figure 11:
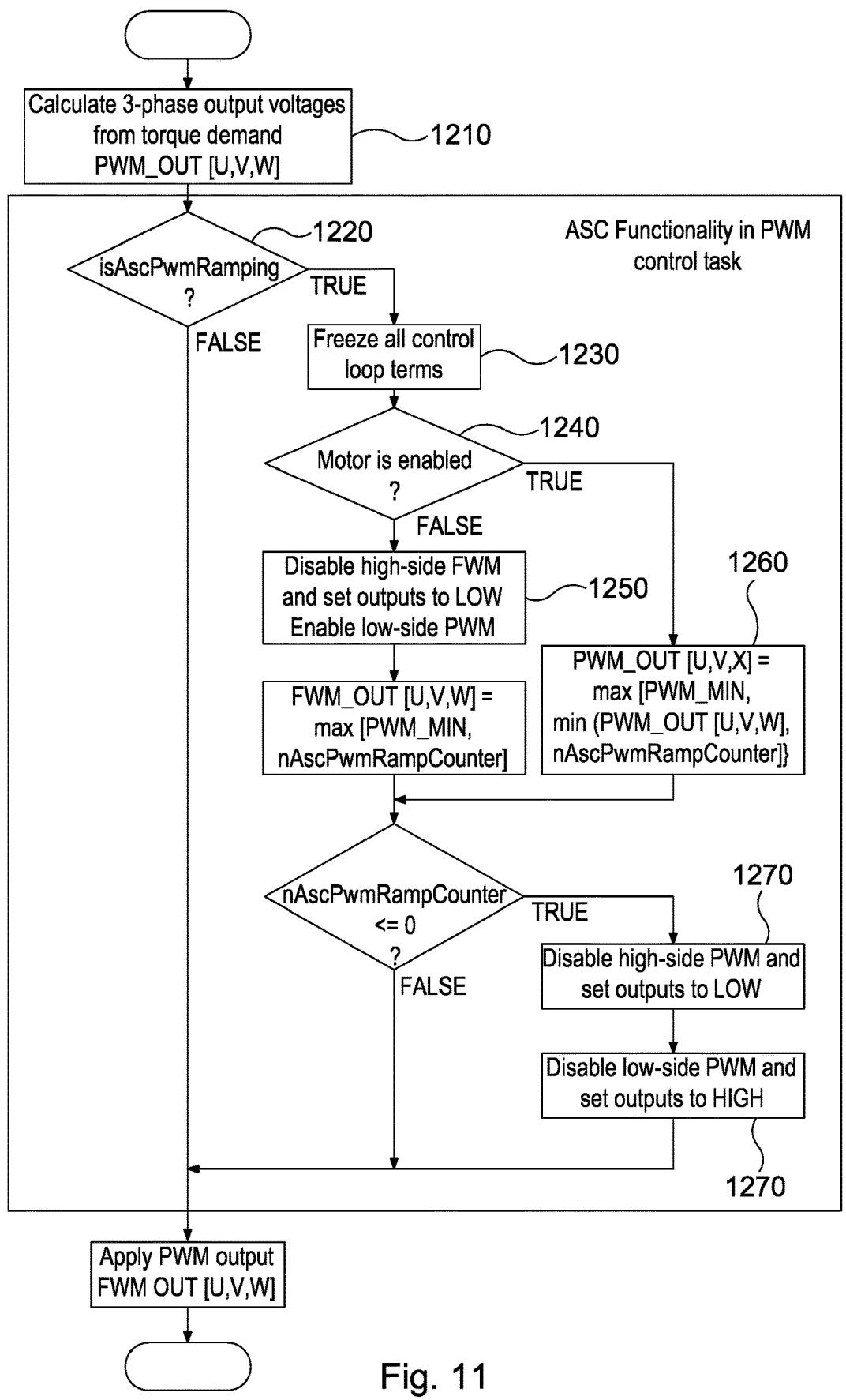
FIG. 11 illustrates a state diagram for implementing a PWM soft start ramp limit according to an embodiment of the present invention.

To further illustrate a preferred embodiment for limiting the available PWM depth, FIG. 11 illustrates a state diagram for controlling the PWM output voltage based on the nAscPwmRampCounter value and the three calculated PWM modulation depths PWM_OUT (U,V,W) 1210 for each of the three phases to allow the correct phase coil voltages to be generated for the respective coil windings. If the motor is already in an open-circuit mode, PWM_OUT (U,V,W) will be ignored, all the high-side switches will all remain in an open-circuit state, and all the low-side switches will have a duty cycle inverse to the PWM soft start ramp, as described above.

Preferably the algorithm represented in FIG. 11 is executed within a motor controller.

Initially a determination 1220 is made as to whether PWM output ramp limiting is in progress. If PWM output ramp is not being limited (i.e. isAscPwmRamping flag is set to FALSE), either the output PWM is applied as normal or the electric motor is maintained in an open circuit mode, which ever mode is applicable.

If, however, upon a determination that the ASC soft-start output ramp limiting process is initiated (i.e. isAscPwmRamping flag is set to TRUE), preferably all control loop feedback terms in the existing output voltage calculations are frozen 1230. This is to prevent any control loop algorithms within the motor controller from affecting the magnitude of the phase voltages during the ASC soft-start ramp time.

A determination 1240 is then made as to whether the electric motor is operating in either a normal operational mode or an open circuit mode.

If the motor is in the open circuit mode, initially both high and low side IGBT switches for the respective inverter legs (i.e. for each voltage phase) will be open circuit, and the PWM output from these outputs will be disabled. Upon activation of the ASC soft-start ramp limit process all the high-side IGBT switches are retained in their open circuit configuration with all the low side IGBT switches being enabled to have a duty cycle set to the inverse of the ASC soft-start ramp limit 1250. For example, if the initial ASC soft-start ramp limit is set at 100 percent (i.e. the available PWM depth is 100 percent) then the low-side IGBT switches are arranged to have a duty cycle of 0%.

Typically there will be a minimum pulse width for the low side IGBTs that needs to be observed in order to prevent 'runt' pulses on the IGBTs.

As the PWM soft-start ramp value (i.e. the nAscPwmRampCounter value) reduces to zero, so the low-side IGBT 'on' time (i.e. the time that the respective low side IGBT switches are in a closed circuit configuration) increases to 100 percent of the PWM period.

If the motor is not in a disabled mode, and electric motor's control device is actively controlling the motor's torque demand, both high-side and low-side IGBT switches will be configured to provide a PWM output voltage from each respective inverter leg.

Upon activation of the ASC soft-start ramping limit process, the output PWM voltage is equal to the calculated output PWM voltage, as determined by a motor control based on the requirements for providing normal operational mode, or the available PWM depth defined by the ASC soft-start ramp limit, whichever of the two PWM depths is the lower 1260.

When the ASC soft-start ramp reaches 0 percent, the PWM output on both high-side and low-side IGBT outputs are disabled. All high-side IGBT switch outputs are set to open circuit, and all low side IGBT switch outputs are set to closed circuit resulting in the inverter/electric motor being placed in active short circuit mode 1270 with the respective coil windings being coupled to the negative power source busbar.

Alternatively, the low-side IGBT output is set to open circuit, and the high side IGBT output is set to closed circuit resulting in the inverter/electric motor being placed in active short circuit mode 1270 with the respective coil windings being coupled to the positive power source busbar.

Figure 12:
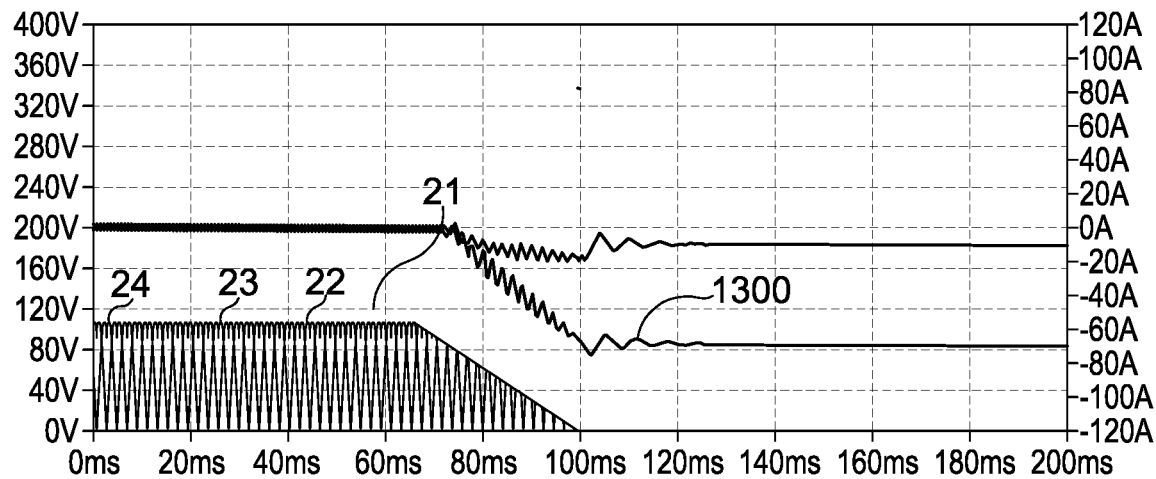
FIG. 12 illustrates simulated motor coil winding current values when transitioning from a normal operational mode to an active short circuit mode according to an embodiment of the present invention.
Figure 13:
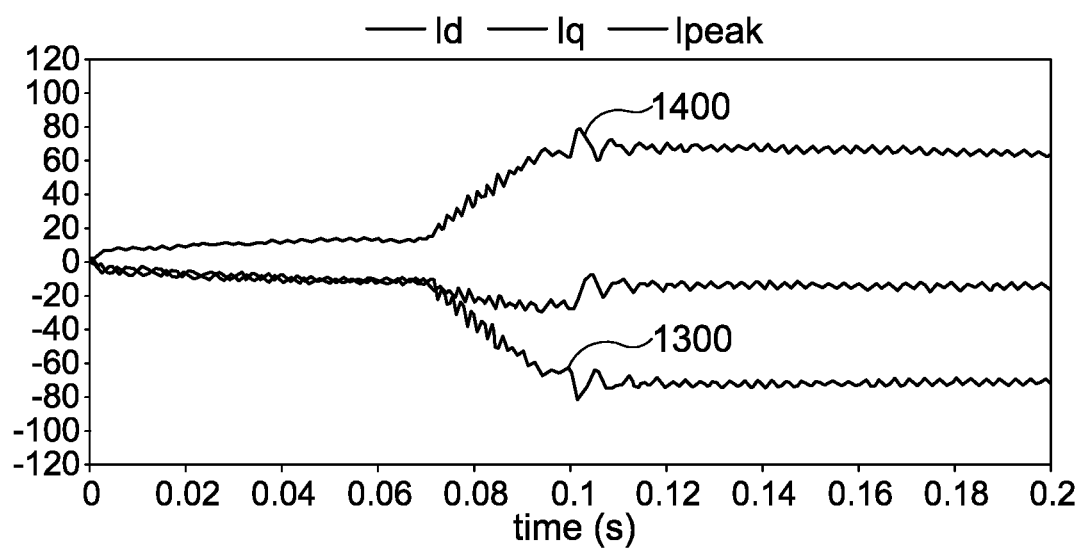
FIG. 13 illustrates measured motor coil winding current values when transitioning from a normal operational mode to an active short circuit mode according to an embodiment of the present invention.

FIG. 12 and FIG. 13 illustrate simulation results and measured results respectively for entering an electric motor into an ASC mode using the above described soft-start ramping process, where the PWM soft-start ramp starts at approximately 65 ms with active short circuit occurring at 100 ms.

As illustrated in both FIG. 12 and FIG. 13, using the above described soft-start limit ramping process embodiment for transition an electric motor from either a normal operational mode or an open circuit mode to an active short circuit mode results in a peak Id current 1300 of −80 A, and the overall current peak 1400 has reduced to 80 A.

The invention claimed is:

1. A method for controlling an electric motor, the method comprising:
    receiving a command to place the electric motor in a short circuit mode;
    receiving a calculated pulse width modulation depth;
    reducing a limit to an available pulse width modulation depth for controlling current flow in the electric motor to a predetermined value over a predetermined time period or at a predetermined rate of change; and
    outputting a pulse width modulation voltage based on the lower value of the calculated pulse width modulation value or the available pulse width modulation depth value;
    wherein upon the pulse width modulation depth limit reaching the predetermined value the electric motor is placed in the short circuit mode.

2. The method according to claim 1, wherein the short circuit mode corresponds to all coil windings of the electric motor being electrically connected to the same power source busbar.

3. The method according to claim 2, wherein all the coil windings of the electric motor are arranged to be electrically connected to a positive power source busbar.

4. The method according to claim 2, wherein all the coil windings of the electric motor are arranged to be electrically connected to a negative power source busbar.

5. The method according to claim 1, further comprising reducing a counter value upon receipt of the command to place the electric motor in a short circuit mode, wherein the pulse width modulation depth limit is dependent upon the counter value.

6. The method according to claim 1, further comprising reducing torque generated by the electric motor to substantially zero Newton metres upon receipt of the command to place the electric motor in a short circuit mode and before reducing the limit of the available pulse width modulation depth.

7. The method according to claim 2, further comprising increasing maximum available pulse width modulation depth if a command is received to take the electric motor out of the short circuit mode.

8. A controller an electric motor, the controller comprising:
    means for receiving a command to place the electric motor in a short circuit mode;
    means for receiving a calculated pulse width modulation depth;
    means for reducing a limit to an available pulse width modulation depth for controlling current flow in the electric motor to a predetermined value over a predetermined time period or at a predetermined rate of change;
    means for outputting a pulse width modulation voltage based on the lower value of the calculated pulse width modulation value or the available pulse width modulation depth value; and
    means for placing the electric motor in the short circuit mode upon the pulse width modulation depth limit reaching the predetermined value.

9. The controller according to claim 8, wherein the short circuit mode corresponds to all coil windings of the electric motor being electrically connected to the same power source busbar.

10. The controller according to claim 9, wherein all the coil windings of the electric motor are arranged to be electrically connected to a positive power source busbar.

11. The controller according to claim 9, wherein all the coil windings of the electric motor are arranged to be electrically connected to a negative power source busbar.

12. The controller according to claim 8, further comprising a counter arranged to reduce a counter value upon receipt of the command to place the electric motor in a short circuit mode, wherein the available pulse width modulation depth limit is dependent upon the counter value.

13. The controller according to claim 8, further comprising means for reducing torque generated by the electric motor to substantially zero Newton metres upon receipt of the command to place the electric motor in a short circuit mode and before reducing varying the limit of the available pulse width modulation depth.

14. The controller according to claim 8, further comprising means for increasing maximum available pulse width modulation depth if a command is received to take the electric motor out of the short circuit mode.

* * * * *